US012488065B2

(12) United States Patent
Geigel

(10) Patent No.: US 12,488,065 B2
(45) Date of Patent: Dec. 2, 2025

(54) SYSTEM AND METHOD OF CLUSTERING MACHINE LEARNING FLOWS

(71) Applicant: Atlantic Technical Organization, San Juan, PR (US)

(72) Inventor: Arturo Geigel, San Juan, PR (US)

(*) Notice: Subject to any disclaimer, the term of this patent is extended or adjusted under 35 U.S.C. 154(b) by 1250 days.

(21) Appl. No.: 17/137,758

(22) Filed: Dec. 30, 2020

(65) Prior Publication Data

US 2022/0207287 A1   Jun. 30, 2022

(51) Int. Cl.
*G06F 18/2323* (2023.01)
*G06F 18/40* (2023.01)
*G06N 20/00* (2019.01)

(52) U.S. Cl.
CPC .......... *G06F 18/2323* (2023.01); *G06F 18/40* (2023.01); *G06N 20/00* (2019.01)

(58) Field of Classification Search
CPC ...... G06F 18/2323; G06F 18/40; G06F 16/56; G06F 7/74; G06N 20/00; G06V 10/762
See application file for complete search history.

(56) References Cited

U.S. PATENT DOCUMENTS

| | | | | |
|---|---|---|---|---|
| 10,453,165 B1 * | 10/2019 | Kostov | ................. | G06N 20/00 |
| 11,288,542 B1 * | 3/2022 | Samplawski | ............ | G06N 3/08 |
| 11,341,354 B1 * | 5/2022 | Ko | ........................... | G06N 3/08 |
| 11,599,840 B2 * | 3/2023 | Cheng | .................... | G06N 20/00 |
| 11,620,574 B2 * | 4/2023 | Parameswaran | ...... | G06F 9/3838 |
| | | | | 706/12 |
| 2015/0039382 A1 * | 2/2015 | Kim | ....................... | G06Q 10/06 |
| | | | | 705/7.27 |
| 2016/0358102 A1 * | 12/2016 | Bowers | .................. | G06N 20/00 |
| 2018/0165604 A1 * | 6/2018 | Minkin | .................. | G06Q 10/06 |
| 2018/0329740 A1 * | 11/2018 | Geigel | .................. | G06F 9/5044 |
| 2021/0264202 A1 * | 8/2021 | Kalluri | ................... | G06N 20/00 |

OTHER PUBLICATIONS

Xin, Doris, et al. ("Helix: Holistic optimization for accelerating iterative machine learning." arXiv preprint arXiv:1812.05762 (2018): 1-21, hereinafter "Xin") (Year: 2018).*

Herbst et al., Integrating Machine Learning and Workflow Management to Support Acquisition and Adaptation of Workflow Models, Jun. 14, 2000, Wiley Online Library, (Year: 2000) (Year: 2000).*

Esteves et al. ("Smart Scheduling of Continuous Data-Intensive Workflows with Machine Learning Triggered Execution." ArXiv preprint arXiv:1612.03852 (2016): 1-21 hereinafter "Esteves") (Year: 2016).*

* cited by examiner

*Primary Examiner* — Imad Kassim

(74) *Attorney, Agent, or Firm* — Luis Figarella

(57) ABSTRACT

A system and method for clustering machine learning workflows according to inclusion/exclusion criteria. The clustering is based on a plurality of information obtained from operators on the workflow, the position on the workflow of each operator and the data each operator is working on. The position of each operator on the workflow is obtained from its graph-based representation embedded on a coordinate system.

1 Claim, 16 Drawing Sheets

| Operator | Operator ID | Operation | Operation ID |
|---|---|---|---|
| DB-1 | 2 | Database connector | 1 |
| JOIN-7 | 5 | Join Data Paths | 2 |
| SPLIT-8 | 4 | Split Data Paths | 3 |
| Classifier-2 | 1 | Supervised Learning Operation | 4 |
| Cluster-12 | 1 | Clustering Operation | 5 |
| SORT ROW... | 1 | Sort Rows Operation | 6 |
| UPLDATA-4 | 1 | Database connector to save Data | 7 |

Figure 5

SYSTEM AND METHOD OF CLUSTERING MACHINE LEARNING FLOWS

BACKGROUND OF THE INVENTION

Field of the Invention

The present disclosure is directed to a system and method for providing assistance to complete machine learning on workflow engines that deal with machine learning flows.

Discussion of the Background

Current trends in machine learning are advancing at a rapid pace. As they become mainstream, machine learning implementations will shift focus from single module implementations or two to three modules to a complex web where dozens of machine learning algorithms operations are carried out. The complexity of this web on which multiple machine learning algorithms processes interact will strain the cognitive limitations of their creators. Some of these issues are already is being documented in other similar scenarios such as the one in *Lost in transportation: Information measures and cognitive limits in multilayer navigation*, by Riccardo Gallotti, Mason A. Porter, and Marc Barthelemy.

The present disclosure is directed at identifying commonalities in multiple machine learning flows by clustering similar flows based on an inclusion/exclusion criterion through properly encoding criteria of the required elements of processing a machine learning workflow.

This process is the first step in a more complex process of getting a machine learning algorithm to learn machine learning flows. Clustering machine learning flows helps in isolating commonalities that machine learning algorithms can use for learning the necessary patterns to construct similar machine learning workflows.

DESCRIPTION AND SHORTCOMINGS OF THE PRIOR ART

While application platforms can offer some level of abstraction by providing graphical user interfaces, hiding the complexity of programming languages, there is still a cognitive overload possibility due to complex workflows that can be developed to manage complex data processing tasks.

U.S. Pat. No. 6,606,613 (the "'613 patent") B1 describes task models to help users complete tasks. This prior art has several shortcomings which are outlined as follows. First, the '613 patent models a single user's tasks whereas the present disclosure aims at parallel processes of tasks which present a different solving paradigm. Second, the clustering used in the '613 patent of similar tasks is based on agglomerative hierarchical clustering and this works for segregating tasks based on intersections and the difference between graphs.

The problem that the present disclosure aims to solve that is not contemplated in the prior art is how to cluster the machine learning workflows not on merely graph properties but also properties of the workflow itself. Properties such as the type of operation and its adjacent operators play a crucial role in establishing a processing pipeline that describes segments of the workflow. The properties that are crucial for proper segregation of the workflows require that each segment of the workflow be described by the operation being done, the algorithm used, the type of data being processed, and the underlying processing infrastructure in a parallel environment. Each of these properties can be further broken down according to processing speed, algorithm complexity, particular operation optimization, etc. These elements are essential in describing each node of processing in a parallel environment which are separate from the graph itself. Further, the graph itself is not a useful concept in parallel operation due to timing issue that might make a difference in processing. Such shortcomings are overcome in the present disclosure by embedding the graph in a coordinate system which can be fitted according to the requirements of comparison.

U.S. Pat. No. 8,954,850 (the "'850 patent") uses agglomerative clustering to assist the user in building a workflow. The objective of this prior art is to detect similar patterns of construction of a flow in terms of the nodes under each branch of the business process. The limitation of this approach is that objects classified within a branch are not treated as sequentially dependent. Such data is indispensable to describe time dependent and operation dependent flows.

Providing appropriate contextual information beyond the graph structure is essential to any accurate matching of workflows, which the prior art does not provide. Contextual information that is not present in the prior art that can be used as properties of the workflow are their appropriate position with regards to other elements, where they are going to be executed, whether multiple flows share the same sequential information and in what order and patterns of multiple operators in a sequence. Discriminating among sequences into different branches of the clusters is also not present in the prior art. All these shortcomings limit the prior art on the degree of accuracy of the automation that can be produced by such methods.

BRIEF DESCRIPTION OF THE DRAWINGS

FIG. 5 shows a database table of a particular implementation of operator types alongside identifying fields according to the teachings of the present invention.

DETAILED DESCRIPTION OF THE PREFERRED EMBODIMENTS

Figure 1:
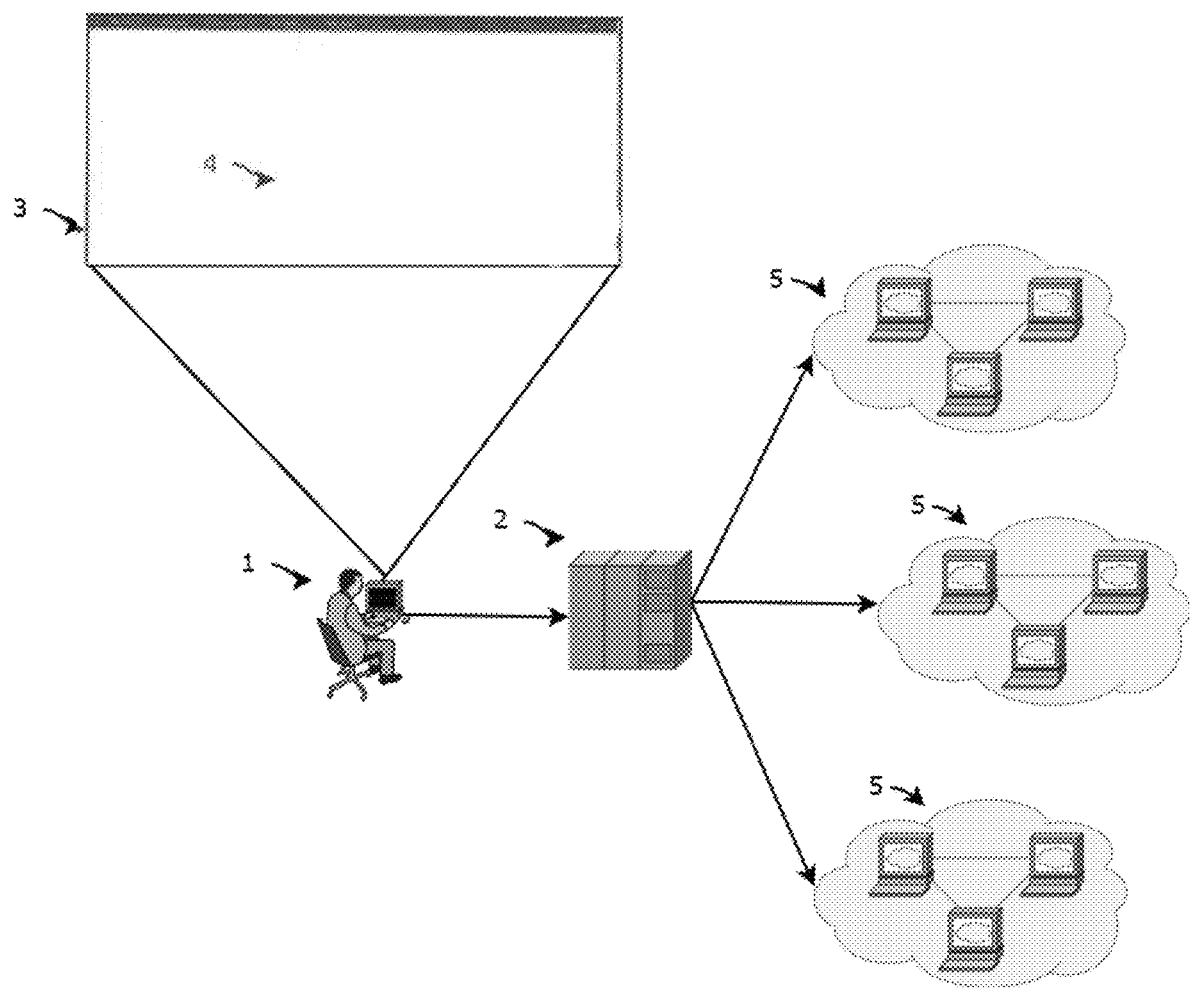
FIG. 1 shows a typical embodiment of a system that performs the functions of making machine learning workflows according to the teachings of the present invention.

FIG. 1 Shows a typical embodiment of a system that performs the functions of making machine learning workflows. The system is accessed by a user through a terminal 1. The terminal 1 is connected to a central processing system 2 that contains memory components and processing units. The terminal accesses the functionality of the of the central processing system via an interface system 3 that has functionality icon 4. The central processing system 2 will process the information given by the interface system 3 and a functionality icon 4 to the terminal systems CPU and memory system or to a distributed architecture 5.

Figure 2:
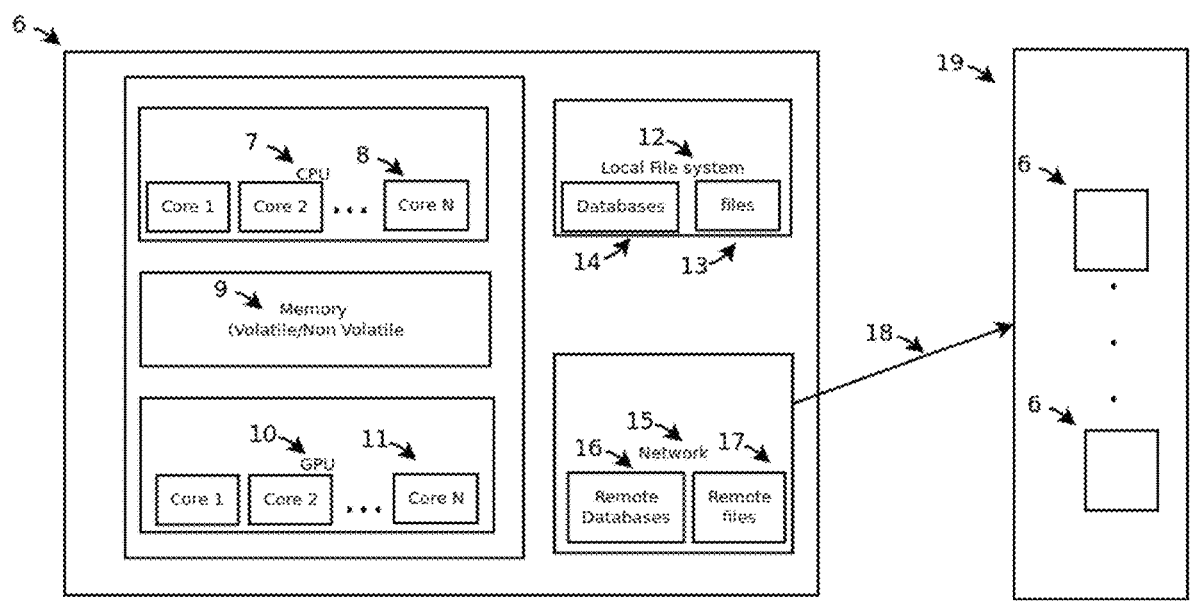
FIG. 2 describes the physical layout of the typical execution environment on which the parallel execution will take place according to the teachings of the present invention.

FIG. 2 describes an example of the physical layout of the typical execution environment on which the parallel execution takes place. A typical embodiment consists of a computer system 6 that contains a CPU 7 with a number of N cores 8. The N cores 8 are capable of doing multi-threading tasks on the CPU 7. The computer system 6 also contains a memory system capable of storing information for processing by the CPU 7. The computer system 6 can also contain a compute capable GPU 10 with a number of N cores 11. Computer system 6 has a local file system 12 that can contain several files 13 and possibly a database system 14. Computer system 6 includes a network interface 15 that can access a remote database system 16 or a remote file system 17. Access to remote database system 16 and/or a remote file system 17 is done through a network card in network 15 via a connection 18 to a cloud infrastructure 19. The cloud infrastructure 19 contains up to n computer systems 6.

Figure 3:
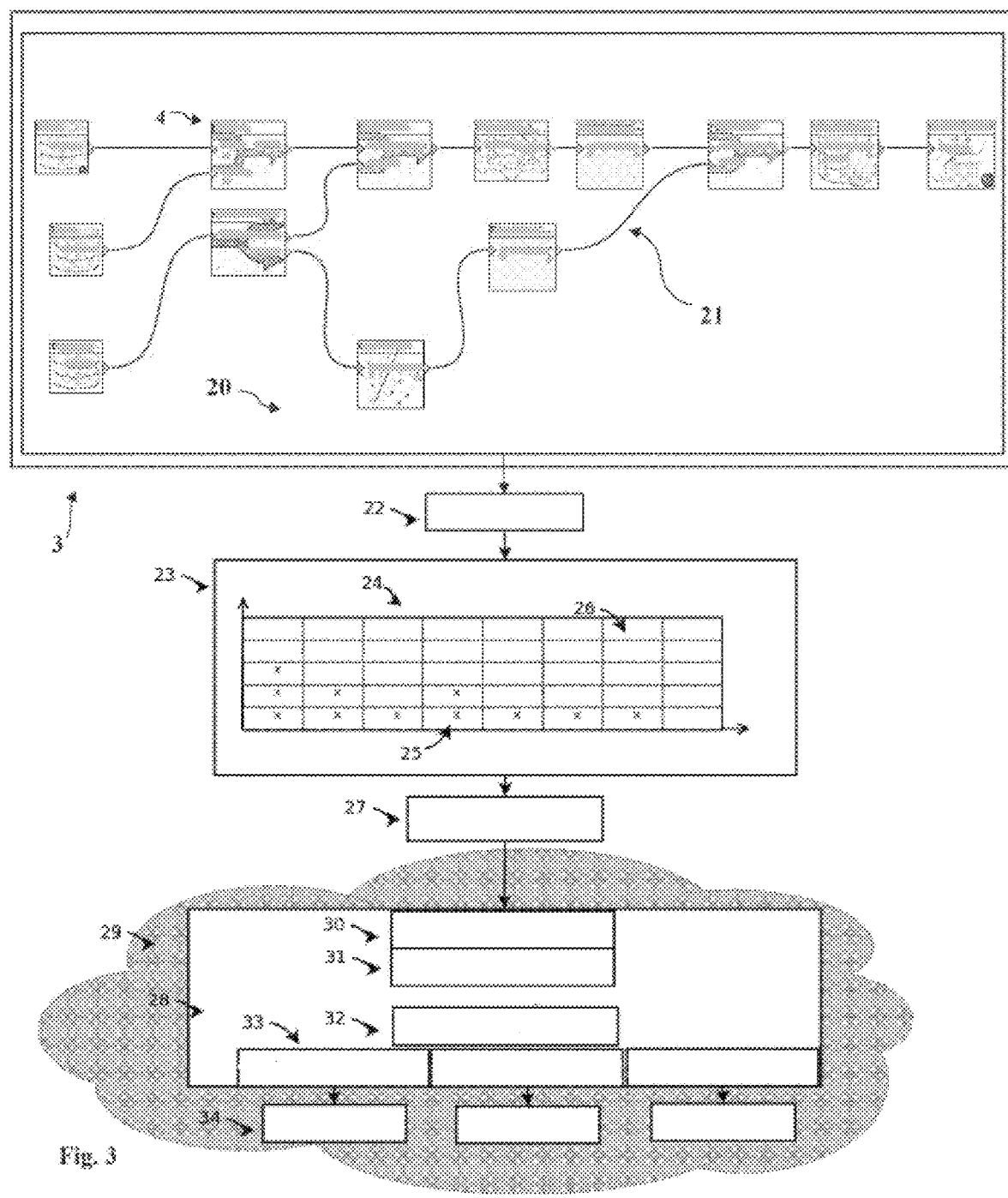
FIG. 3 displays a graphical representation of the major components of an exemplary system that can perform the functions of making machine learning workflows according to the teachings of the present invention.

FIG. 3 Displays a graphical representation of the major components of an exemplary system that can perform the functions for making machine learning workflows. The system starts with the interface system 3 that has functionality icon 4, which contains the configuration that the system will execute. An execution program 20 is specified by the functionality icon 4 connected via a link 21. Once the execution program 20 is finished the program will be forwarded to an execution manager 22. The execution manager 22 will reside on the central processing system 2 which is a typical computer system 6. The execution manager will produce an execution map 23 based on the execution program 20. The execution map 23 contains an execution matrix 24 that will store the order of the execution. Each entry in the execution matrix 24 is assigned an execution slot 25 that can be filled with an execution entry 26 that corresponds to functionality icon 4. Once the execution map 23 is completed it is passed to a controller 27 that also resides central processing system 2. The controller coordinates the execution with an execution engine 28 across the cloud environment 29. Cloud environment 29 is composed of cloud infrastructure 19 that contains up to n computer systems 6. The controller 27 communicates to an execution engine coordinator 30 that resides on one of n computer systems 6 of cloud environment 29. The execution engine coordinator 30 uses a hardware selector 31 to discriminate which component of computer systems 6 should be used. For example, hardware selector 31 can choose between execution between the N cores 8 on the CPU 7 or use GPU 10 or other processing technology. Once hardware selector 31 chooses the particular processing technology, the hardware selector 31 selects a hardware optimizer 32 which coordinates with a hardware software module 33 that contains the necessary routines to interact with hardware 34.

Figure 4:
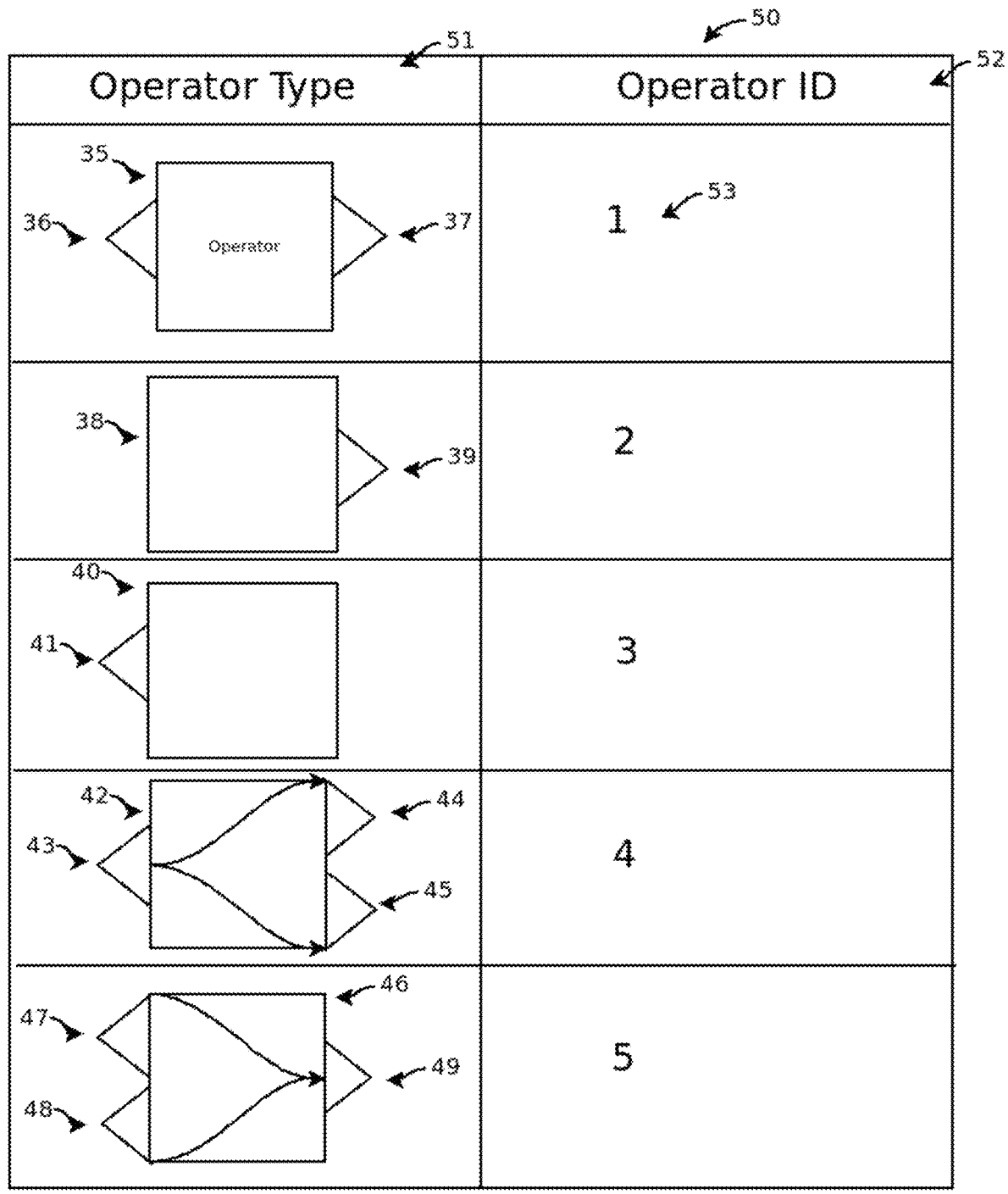
FIG. 4 shows the categories of graphical operator elements according to the teachings of the present invention.

FIG. 4 shows the categories of graphical operator elements. Functionality icon 4 of interface system 3 can be divided into several icon types with specific functions that are independent of the particularity of the operations they are required to perform. FIG. 4 shows an operator 35 that has an input link connector 36 and an output link connector 37. The operator 35 represents an operation that has one input and one output. For example, this may represent a single instruction single datum (SISD) or single instruction multiple data operation (SIMD). An operator 38 contains an output link connector 39 representing a source operation. A source operation can be usually be taken but not limited to data extraction from a source that can be a database, file, web service, or other similar operation that does not accept an input to the operator. An operator 40 contains an input link connector 41 representing a destination operation. A destination operation can be usually be taken but not limited to data storage such as insertion to a database, file, web service or other operation that only accepts an input to the operator. An operator 42 represents a split operation. The operator 42 has an input link connector 43 that represents the input to the system. The operator 42 also contains an output link connector 44 and an output link connector 45. The split operation done by operator 42 takes one input through input link connector 43 and performs a split of the data into separate streams that are redirected to output link connector 44 and output link connector 45. Finally, an operator 46 represents a join operation. The operator 46 has an input link connector 47 and an input link connector 48. The operator 46 also contains an output link connector 49. The join operation carried out by operator 46 takes two data streams through input link connector 47 and input link connector 48 and joining the data stream into a single output that is sent to output link connector 49. The type of joining of data of operator 42 and splitting of data by operator 46 is independent of the operator type. A database table 50 can store the categories represented in operators 35, 38, 40, 42, 46 in a column 51 and have an operator ID column 52 storing an ID 53 that will be used to identify particular implementations of operators 35, 38, 40, 42, 46.

FIG. 5 shows a database table of an exemplary implementation of operator types alongside identifying fields. A database table 54 holds an operator field 55 that holds an operator 56. The operator 56 is given its diagrammatic form via functionality icon 4. The operator 56 is described by an operation field 57 that provides a description of what the operator does. The operator 56 is associated via database table 64 to operator ID column 52 of database table 50 via an operation ID field 58 thereby linking a particular operator with its type.

Figure 6:
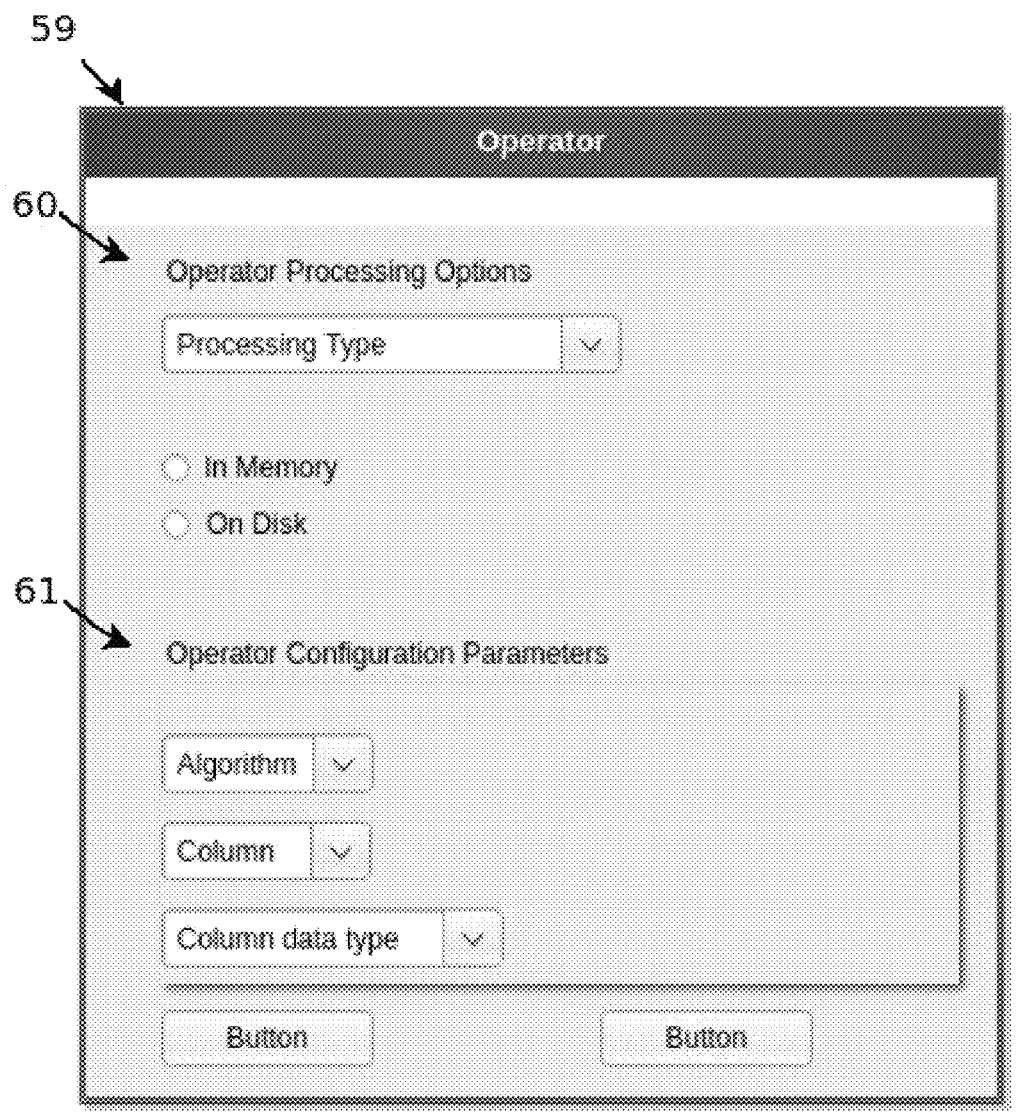
FIG. 6 shows an example of general fields that make up the configuration parameters of an operator according to the teachings of the present invention.

FIG. 6 shows an example of general fields that make up the configuration parameters of an operator. The operator 56 accessed on interface system 3 via functionality icon 4 which will then present a configuration window 59. The configuration window can have multiple configuration parameters. Such parameters can be divided into an operator processing options 60 and operator configuration parameters 61. Operator processing options 60 depend on the particular hardware options of terminal 1, the central processing system 2 and distributed architecture 5. Operator processing options 60 depend on the type of process or algorithm implemented and the data characteristics on which the operator will act upon.

Figure 7:
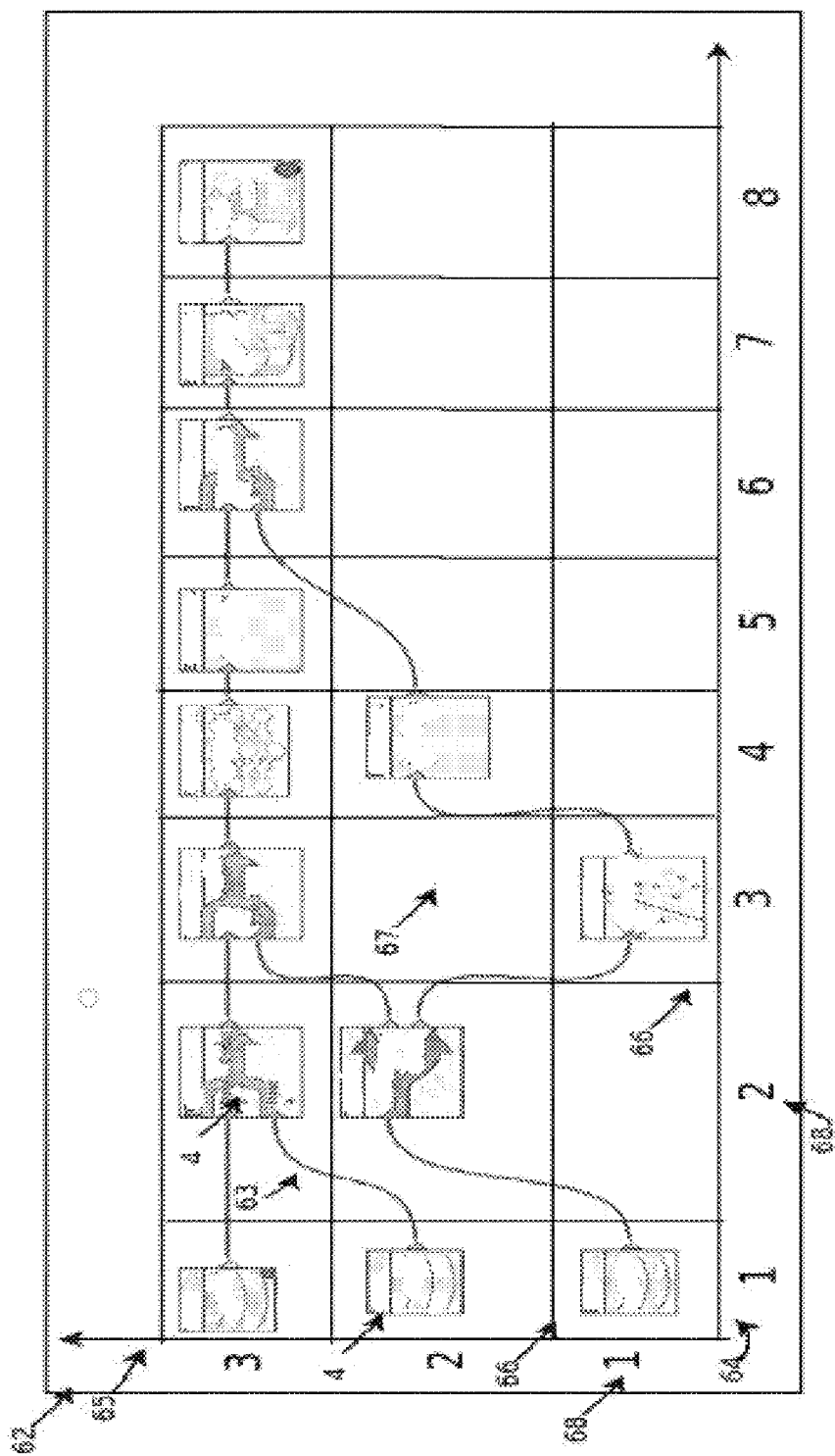
FIG. 7 Shows an execution map representative of a machine learning workflow divided into a grid where operators can be identified within a particular workflow according to the teachings of the present invention.

FIG. 7 shows an execution map representative of a machine learning workflow divided into a grid where operators can be identified within a particular workflow. A machine learning workflow 62 is representative of a typical machine learning flow. The flow is composed of functionality icons 4 which are joined by a workflow line 63. The machine learning workflow 62 can be put into a context of a grid by adding an x-grid line 64 and an y-grid line 65. The x-grid line 64 and the y-grid line 65 can each be divided by a line segments 66 that make up a square segment 67. Each segment 67 can then be identified by a number 68 on the x-grid line 64 and an y-grid line 65. The square segment 67 can be empty or populated by functionality icons 4. The functionality icon that is mapped to an operator 56 can give each square segment 67 a maximum number of line segments 66 depending on the description on database table 50 of operator 56. This particular implementation makes validation of the flow deterministic in nature.

Figure 8:
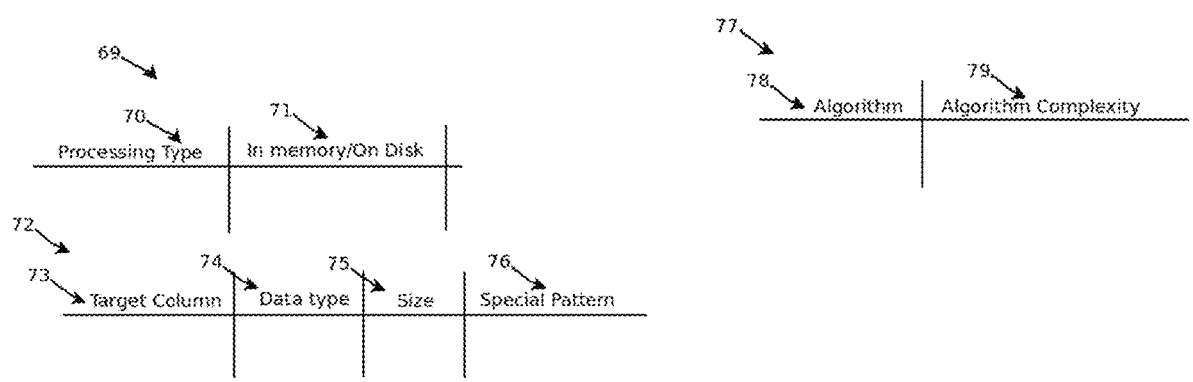
FIG. 8 shows a table representation of descriptive fields of the operators according to the teachings of the present invention.

FIG. 8 shows a table representation of descriptive fields of the operators. A database table 69 shows properties of the operator 56 configuration that is done in configuration window 59 of FIG. 6. Database table 69 contains fields that belong to the particular hardware configuration parameters of the operator 56 such as a processing type field 70 that indicates whether it is single processor, multi core execution, GPU, etc., and a field 71 for in memory/on disk execution type. A database table 72 contains data parameters on which the operator 56 will execute on. A database table 72 contains attributes that belong to the data on which the operator 56 has been implemented on. The table 72 contains a column 73 which contains the target column of a file that has a vector format where each column belongs to a vector component. Table 72 also contains a column 74 that specifies the data type of the target data column identified in column 73. Column 73 can be represented as the column name, its position on the file, its identification number or a combination of fields or a composite of fields. Table 72 also contains a column 75 for the size of the data field. The size of the field can be interpreted as the number of characters of a string or the precision of a double precision number. The table 72 also contains a column 76 that holds particular patterns of the data such as those encoded by a regular expression or other such specification. A database table 77 contains information pertaining to the algorithm used in operator 56. The database table 77 contains information encoded in columns such as a table column 78 for the particular algorithm and a database table column 79 that specified the algorithm complexity of the particular algorithm implemented. This fields are not to be construed as the only fields to be included in database tables 69, 72 and 77 but as representative examples of each category of each respective table and the information to be stored in them.

Figure 9:
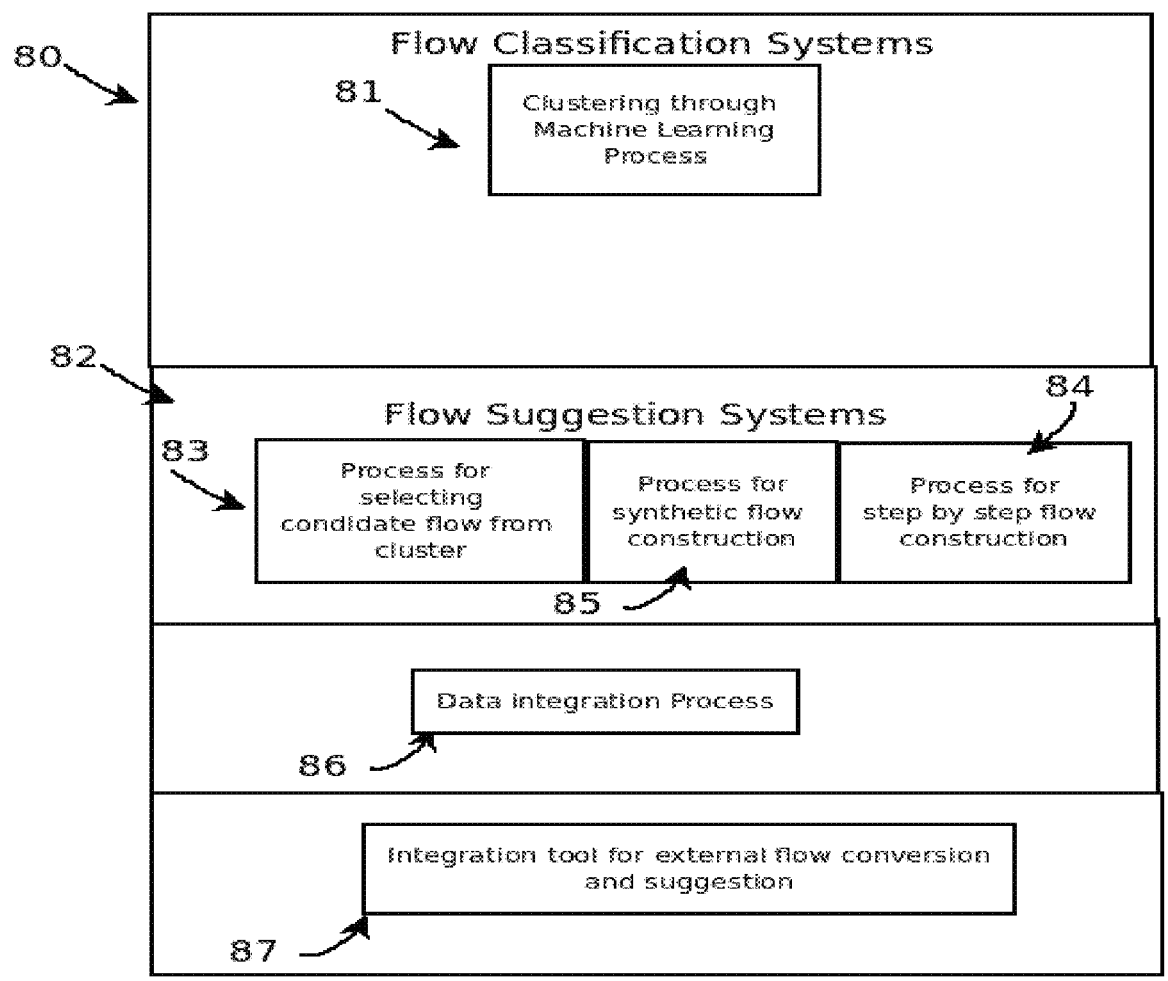
FIG. 9 describes the different components that make up a suggestion system according to the teachings of the present invention.

FIG. 9 describes the different components that make a suggestion system for classifying machine learning flows. A flow classification system 80 contains a subsystem 81 that implements clustering through machine learning processes. The flow classification process 80 also includes a subsystem 82 for machine learning workflow normalization and suggestion. The subsystem 82 of normalization flow suggestion system comprises of a subsystem 83 the enables the process of selecting a candidate flow from the clusters obtained in the classification process 80, a subsystem 84 of step by step construction of the machine learning workflow, and a subsystem 85 that does a synthetic workflow construction. This synthetic workflow does not select a candidate workflow but instead builds it completely based on the information available from the workflows in the cluster. The flow suggestion system also contains a subsystem 86 that can take the selected workflow from subsystem 83, subsystem 84, and subsystem 85 and checks and adjusts its workflow components according to the available data connections. The flow suggestion system further contains subsystem 87 for translation and integration with other similar applications.

Figure 10:
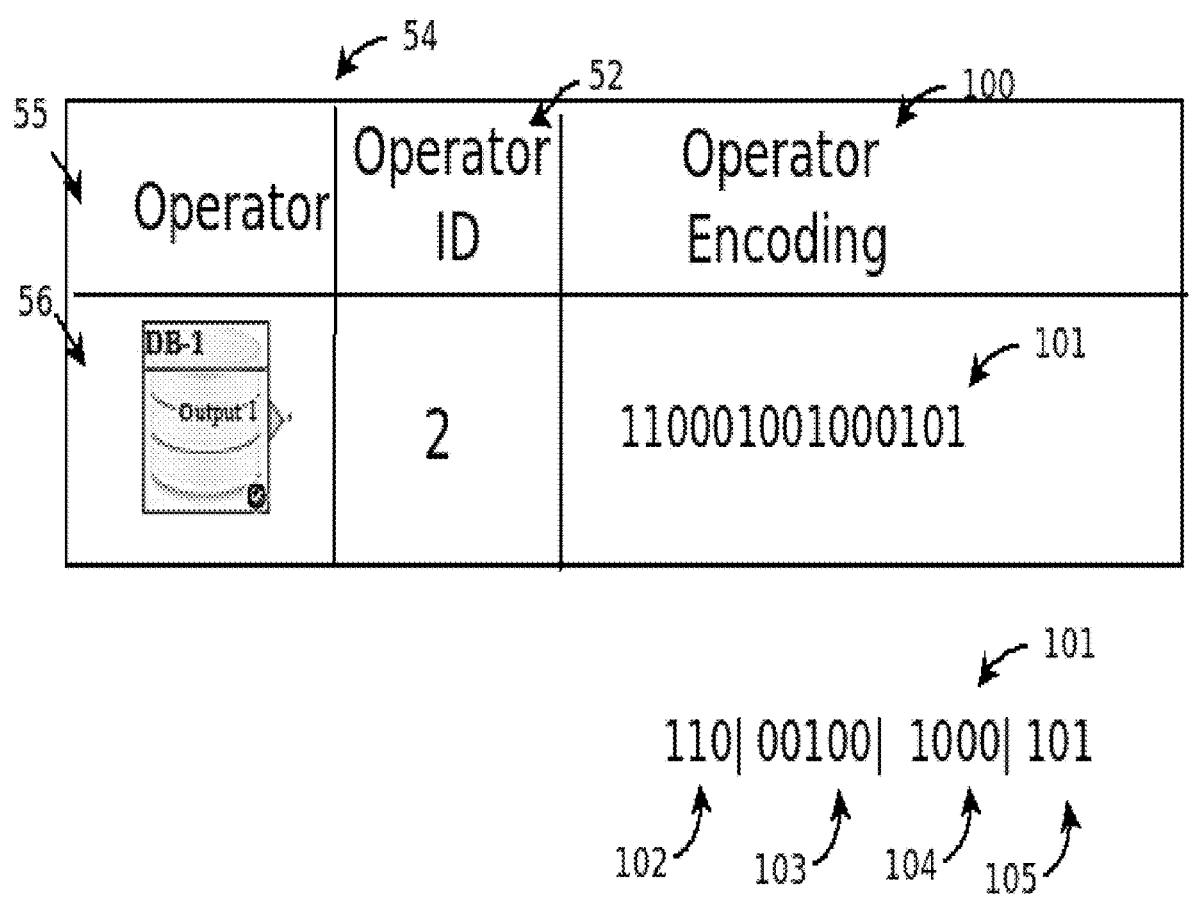
FIG. 10 show a database table containing encoding information for the operators according to the teachings of the present invention.

FIG. 10 shows a database table containing encoding information for the operators. Database table 54 is shown with a column 100 that is an additional column used to store encoding information 101 about operator 56. The encoding information 101 can be broken into a substring 102 identifying the operator. The encoding information also contains a substring 103 used to encode information about the algorithm used, a substring 104 encoding the attributes that belong to the data being processed, and a substring 105 containing the encoding of the hardware configuration parameters. The encoding information can be binary or any other format suitable to accommodate the process being used.

Figure 11:
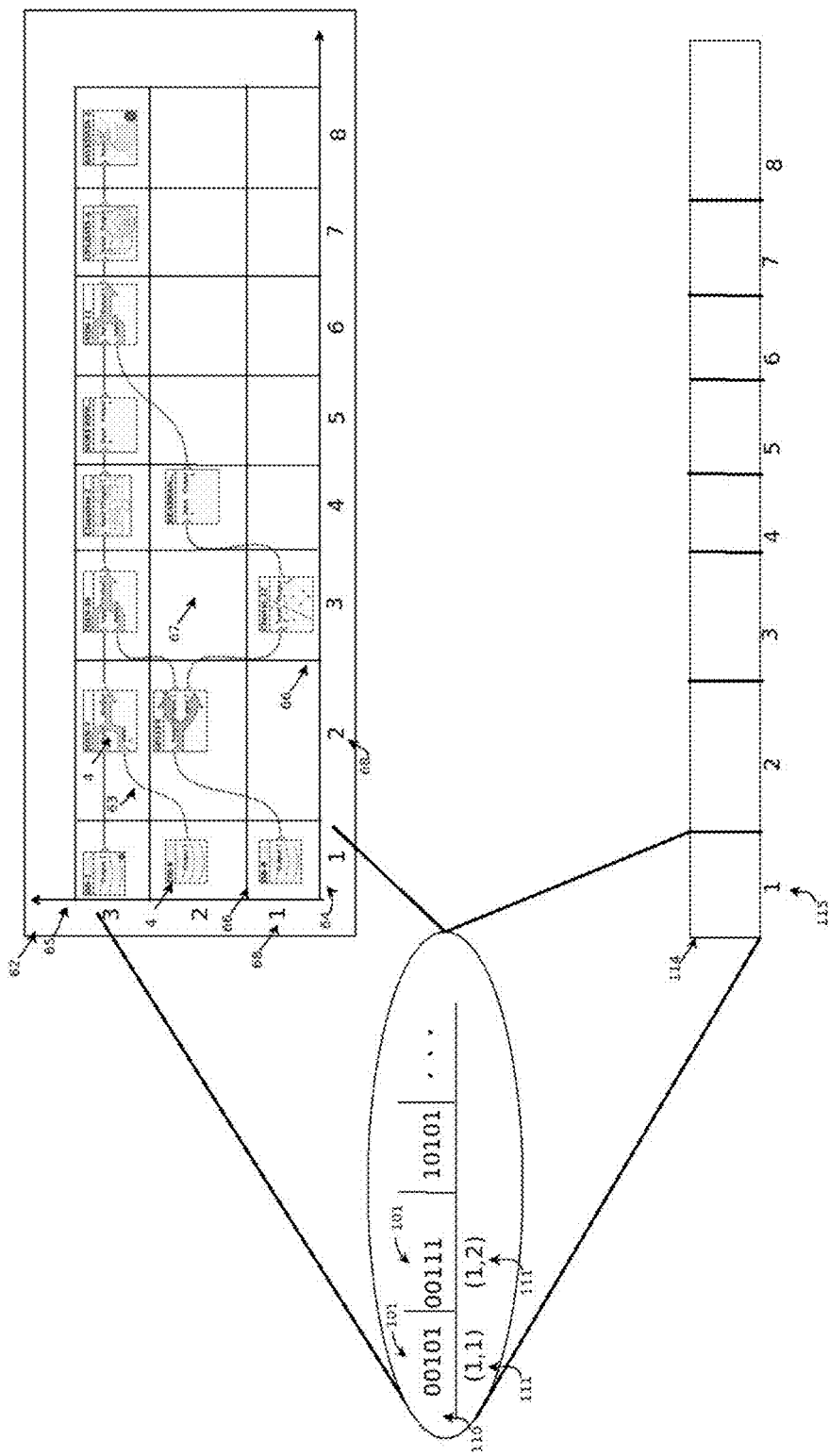
FIG. 11 shows the process of converting a machine learning workflow into an encoded string for machine learning processing according to the teachings of the present invention.

FIG. 11 shows the process of converting a machine learning workflow into an encoded string for machine learning processing. Each of the functionality icons 4 in machine learning workflow 62 is representative of an operator 56 and each operator 56 in turn has encoding information 101. Each functionality icon is associated with a grid coordinate represented by x-grid line 64 and y-grid line 65. Line segments 66 along the x-grid line 64 and y-grid line 65 divides the y axis and x axis into rows and columns and each position in this row and column formation can be identified using number 68. A column encoding 110 takes each functionality icons 4 and looks for its corresponding operator 56 entry in database table 54 and associates it with its corresponding encoding information 101. The column encoding 110 consists of each of the encoding 101 that belongs to the operator 56 used in each of the functionality icons 4 of a particular column of the machine learning workflow 62. The column encoding 110 is done sequentially as represented by a x-y coordinate 111 where the first number corresponds to the column and the second number represents the row. An alternative embodiment consists of doing the encoding utilizing a row encoding instead of a column encoding.

Figure 12:
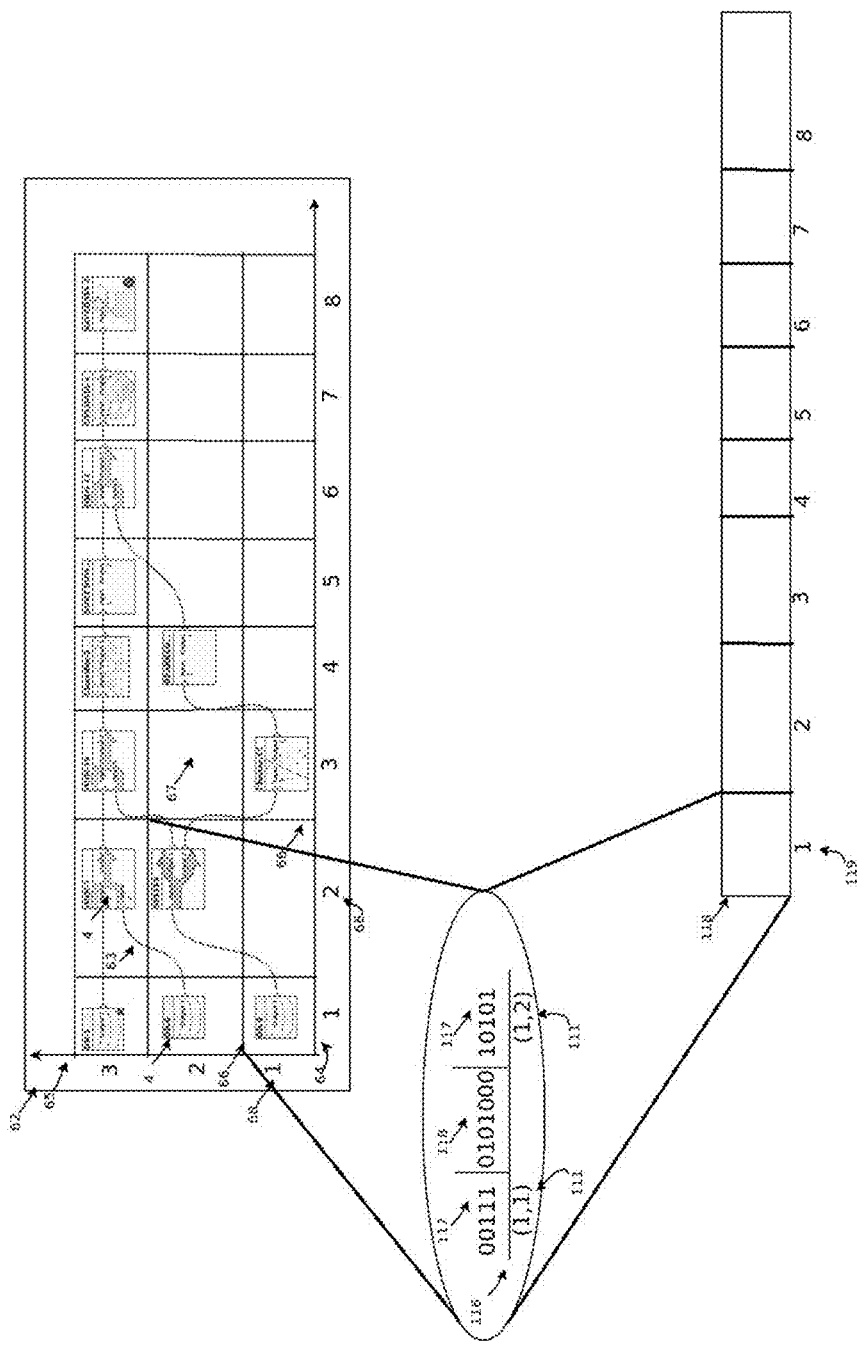
FIG. 12 shows the process of converting a machine learning workflow into an encoded string for machine learning processing using n-operators linked together according to the teachings of the present invention.

FIG. 12 shows the process of converting a machine learning workflow into an encoded string for machine learning processing using n-operators linked together. Each of the functionality icons 4 in machine learning workflow 62 is representative of an operator 56 and each operator 56 in turn has encoding information 101. Each functionality icon is associated with grid coordinate represented by x-grid line 64 and y-grid line 65. Line segments 66 along the x-grid line 64 and y-grid line 65 divide the y axis and x axis into rows and columns and each position in this row and column formation can be identified using number 68. A node-link-node encoding 116 takes each functionality icons 4 and looks for its corresponding operator 56 entry in database table 54 and associates it with encoding information 117. The node-link-node encoding 116 consists of each of the encoding 117 that belongs to the operator 56 used in each of the functionality icons 4 of a particular column of the machine learning workflow 62 and a link encoding 118. The link encoding 118 contains information of the link between the two nodes as well as the x-y coordinate 111 of each encoding 117 before and after link encoding 118, resulting in a composite of node-link-node information. Each node-link-node encoding 116 is placed in a vector 119 where each node-link-node encoding 116 is identified by a position 120. The present disclosure has described the basic node-link-node combination as an exemplary embodiment, however, this in no way limits the disclosure to a node-link-node-link-node expansion which is an extension of the current embodiment, or other similar extensions.

Figure 13:
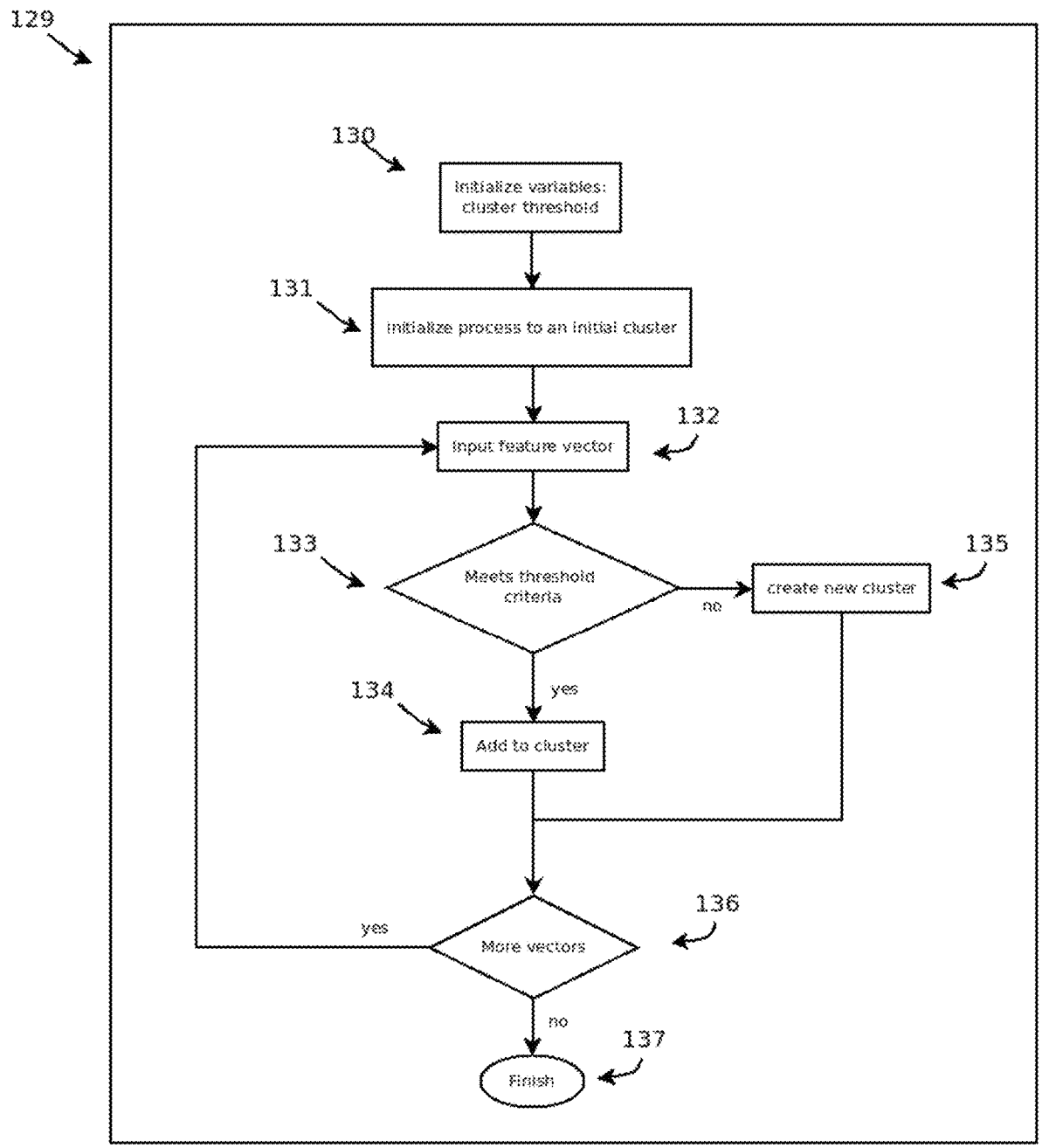
FIG. 13 shows the process that carries out the clustering operation utilizing the disclosed feature vectors according to the teachings of the present invention.

FIG. 13 shows the process that carries out the clustering operation utilizing the disclosed feature vectors. A clustering flowchart process 129 details the steps carried out by the classification process of workflows. The clustering flowchart 129 process starts by an initialization stage 130 where the relevant variables such as the cluster threshold and other variables are initialized. The cluster threshold variable can be the cluster inclusion as well as cluster exclusion or both types. The initialization stage 130 step is then followed by a cluster initialization step 131 that assigns an initial cluster member either randomly or through some other criteria (such as operator objective differences) to one or more clusters depending on the particular clustering implementation. Following the cluster initialization step 131, an input step 132 presents a flow vector to the clustering algorithm. Following the input step 132 a decision step 133 decides if the flow vector matches an already existing cluster or clusters. If the decision step 133 is positive in the case of inclusion criteria, then the particular flow vector shown to the clustering algorithm is assigned to the cluster that its criteria is met in an add to cluster step 134. If the decision step 133 is negative, then a creation step 135 creates a new cluster on which to assign the flow vector. Both add to cluster step 134 and creation step 135 are followed by a decision step 136 that determines if more flow vectors are shown to the clustering process. If the decision step 136 is positive the process will go to input step 132 to present another flow vector to the process. If the decision step 136 is negative, then it goes to a finish step 137 for process conclusion.

Figure 14:
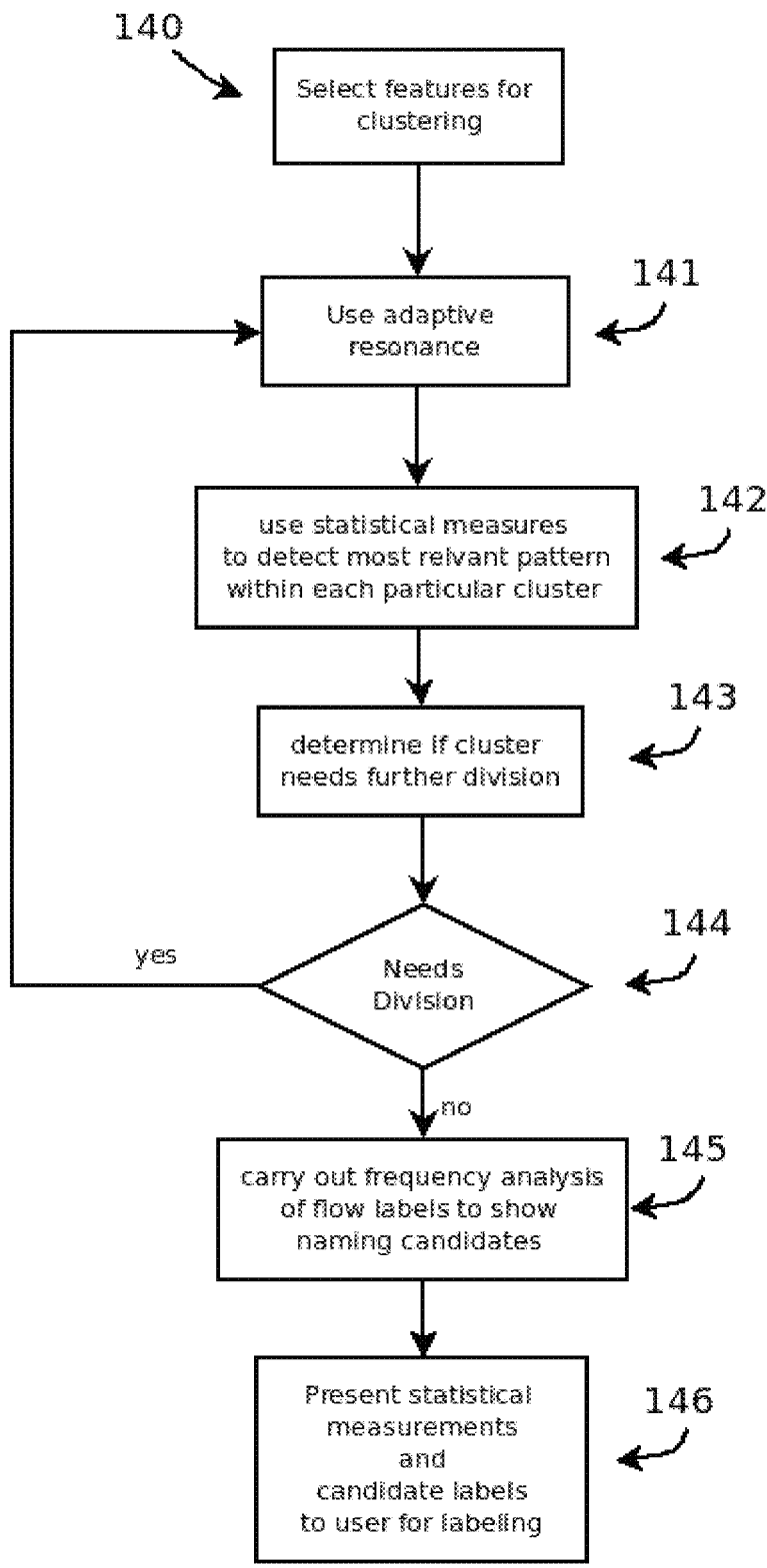
FIG. 14 shows the clustering process applied to the assignment of labels to the clusters according to the teachings of the present invention.

FIG. 14 shows the clustering process applied to the assignment of labels to the clusters. The assignment of labels process starts with a step 140 of selecting the flow vectors to show to the clustering algorithm. Step 140 is followed by a step 141 that represents the clustering flowchart process 129 of FIG. 13. The general clustering flowchart process 129 is instantiated as a way of presenting a concrete implementation through the use of adaptive resonance. This in no way limits the clustering flowchart process 129 since other clustering algorithms and schemes can be used. Furthermore, the adaptive resonance implementation should also not limit the implementation of other criteria such as distance metrics that can be utilized by clustering algorithms. Step 141 is followed by a step 142 where the individual clusters are analyzed with statistical measurements such as frequency analysis to determine the most common operators that are used throughout the cluster. Such measurements can also be extended to include position in the flow, operator co-occurrences, linked operator co-occurrences, among other such measurements. Step 142 determines a step 143 where the measurements of step 142 are used to determine if a hierarchy of sub clusters need to be implemented within a particular cluster. The determination carried out in step 143 is given to a decision step 144 that if the determination is positive then the process returns to step 141. If decision step 144 is negative, then a step 145 is carried out where the names of the flows given to each of the individual flows in the cluster are compared to determine similarities. The similarities can then be used to select a candidate label, form a composite label or to select multiple possible candidates. The step 145 is then followed by a step 146 where the complete analysis is shown to the user for evaluation of cluster fitness and label assignment.

Figure 15:
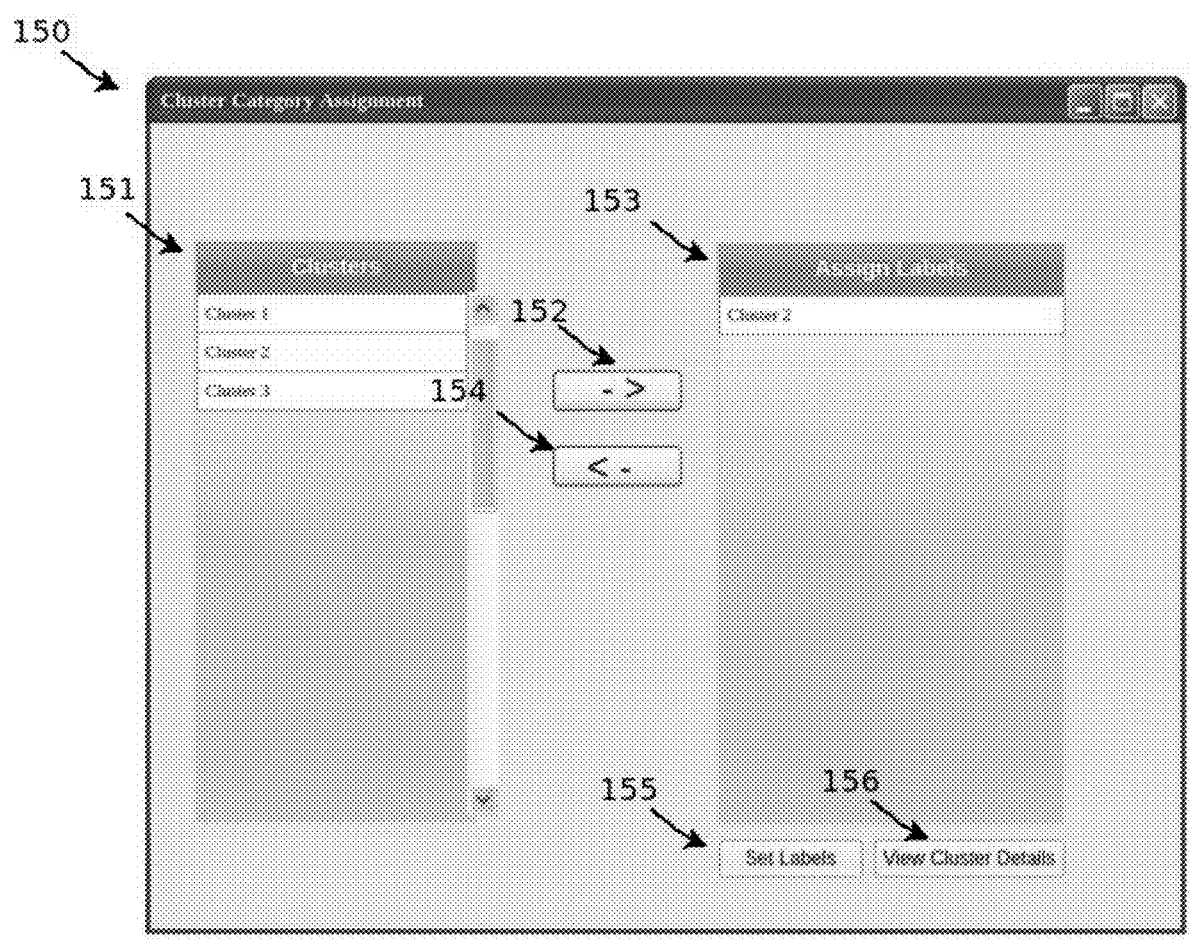
FIG. 15 shows a graphical user interface to review labels of clusters according to the teachings of the present invention.

FIG. 15 shows a graphical user interface to review labels of clusters. A user interface 150 is shown to the user as part of step 146 of FIG. 14. The user interface shows a window section 151 where it displays the clusters derived by the clustering process. The cluster names are taken from step 145 or assigned sequentially as "cluster number x". A selection button 152 allows the movement of selected clusters to be selected and put in a window section 153. A button 154 allows for the deselection of clusters from window section 153 and put back in window section 151. Once the cluster is in window section 153 a button 155 allows for the acceptance of the labels and set the names displayed to their respective flows. A button 156 allows the user to call another window that will display cluster details for further analysis before accepting the class labels.

Figure 16:
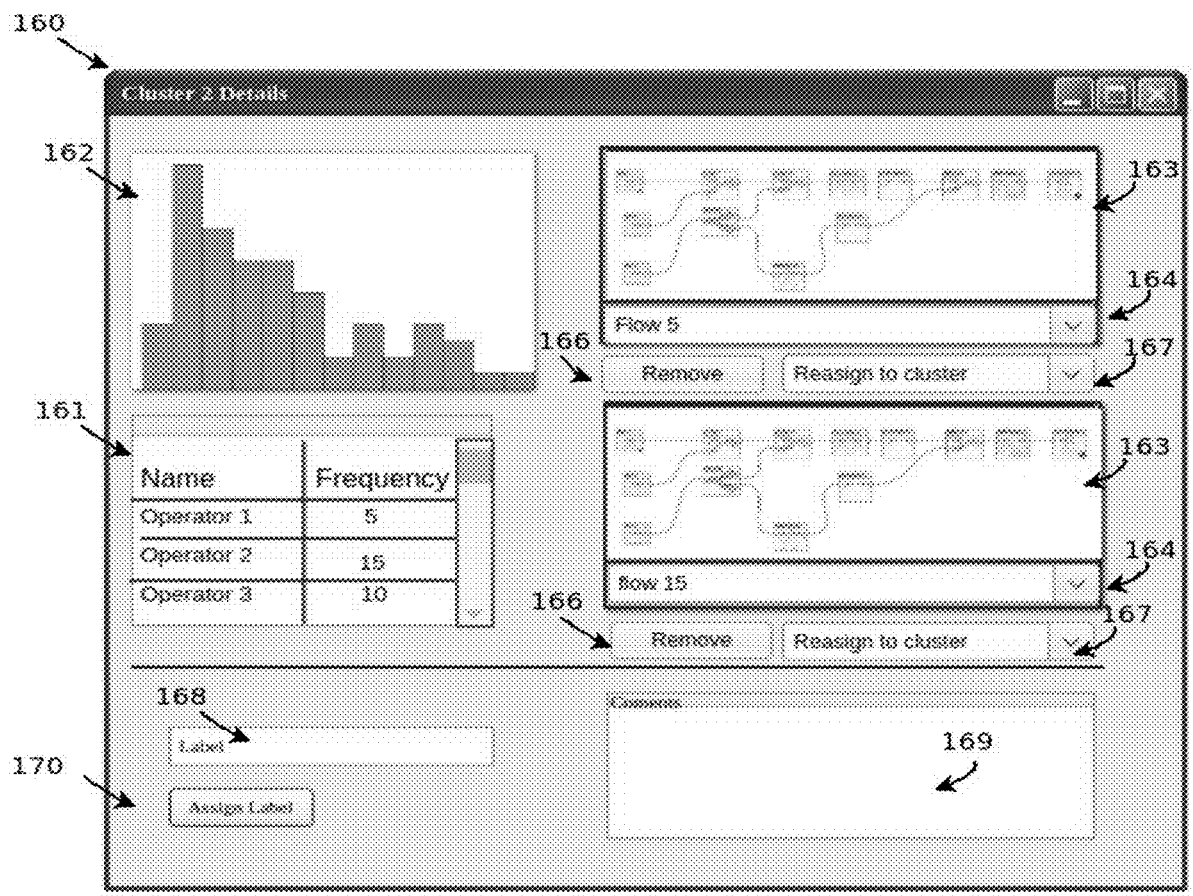
FIG. 16 shows the user interface to edit the cluster details from the output made by the clustering process according to the teachings of the present invention.

FIG. 16 shows the user interface to edit the cluster details from the output made by the clustering process. A window 160 is the window presented to the user once it selects button 156 that allows the user to display cluster details. Window 160 has a grid 161 that displays the name of the operators from all the clustered machine learning workflows and displays the frequency of occurrence of each operator. The grid is not limited to just the frequency display but may display additional information such as operator details among other relevant data. The frequency information of grid 161 is displayed in a graphic 162 that displays the frequency histogram of operator in the selected cluster. Particular flows in the cluster can be viewed in a graphical representation 163 of the machine learning workflow. The selection of a particular workflow from the cluster can be selected through a drop-down menu 164 or other similar means. A button 166 allows the selected cluster from drop down menu 164 to be deleted from the cluster membership. Alternatively the cluster from drop-down menu 164 can be reassigned to another cluster through a drop down menu 167 or similar selection device. A textbox 168 allows the user to override the particular label assigned by the clustering process of FIG. 14. A text field 169 allows the user to document relevant aspects of the process and once the user is finished a button 170 saves the information to a permanent storage medium.

What is claimed:

1. A computer-implemented method for automatically converting a machine learning workflow into an encoded string for computer executed machine learning processing, wherein said machine learning workflow comprises a plurality of operators configured in a coordinate grid and a plurality of links between said plurality of operators, said method comprising executing, within at least one computer processor and at least one computer memory, computer code to implement the steps of:

Using the at least one computer processor;

using the at least one computer memory;

accessing at least on database, said database storing the plurality of operators;

assigning within said database an operator string to each operator of said plurality of operators;

wherein each functionality icon of a plurality of functionality icons in the machine learning workflow is representative of each operator, and each said operator in turn has encoding information, and each said functionality icon is associated with a grid coordinate represented by an x-grid line and a y-grid line;

wherein line segments along said x-grid and y-grid divides an x axis and a y axis into rows and columns and are identified using a number, so that column encoding takes each said functionality icon and looks for a corresponding operator entry in a database table and associates said operator entry with said operator's corresponding encoding information;

wherein the column encoding consists of each encoding that belongs to each of the operators used in each of the functionality icons of a particular column of said machine learning workflow;

wherein the column encoding is done sequentially as represented by x-y coordinates; where a first number represent a column and a second number represent a row;

wherein each of said operator string comprises a plurality of substrings within said database;

deriving within said computer memory a vector comprising a plurality of positions from said rows and columns;

wherein each position of said plurality of positions comprises a combination of said operator strings and said operator's corresponding encoding information;

said computer-implemented method further comprising the steps of:

assigning a link string for every link in said plurality of links;

wherein each of said link strings comprises:

encoded information of each link in said plurality of links;

an encoded coordinate operator located in the coordinate grid;

wherein the column encoding takes each functionality icon and looks for the corresponding operator entry in the database table within said computer memory and associates said operator entry with said operator entry corresponding encoding information;

an encoded coordinate corresponding each link to said each operator located after each link in said coordinate grid;

wherein said encoded coordinate is comprised of a corresponding column from one x coordinate grid line and a corresponding row from one y coordinate grid line;

wherein said column and said row are sequentially positioned in the encoding; and wherein each of said plurality of positions comprises a combination of at least one link string and the operator strings corresponding to the operators located before and after each link corresponding to said at least one link string;

wherein said encoding information is added to a group of previously encoded workflows;

wherein said group of previously encoded workflows is processed by a clustering algorithm;

wherein said clustering algorithm compares said group of previously encoded workflows to derive similarities;

wherein said similarities are used to manually assign labels;

wherein said labels are then to be used to reference the clusters produced by said clustering algorithm;

wherein clusters are passed to a subsystem that carries out candidate workflow selection, synthetic workflow construction and workflow construction suggestions.

* * * * *